US008707431B2

(12) United States Patent  
Stephens et al.

(10) Patent No.: US 8,707,431 B2  
(45) Date of Patent: Apr. 22, 2014

(54) INSIDER THREAT DETECTION

(75) Inventors: Gregory D. Stephens, Springfield, VA (US); Marcus A. Maloof, Bethesda, MD (US)

(73) Assignee: The MITRE Corporation, McLean, VA (US)

( * ) Notice: Subject to any disclaimer, the term of this patent is extended or adjusted under 35 U.S.C. 154(b) by 1249 days.

(21) Appl. No.: 11/790,225

(22) Filed: Apr. 24, 2007

(65) Prior Publication Data

US 2008/0271143 A1 Oct. 30, 2008

(51) Int. Cl.  
*G06F 12/14* (2006.01)  
*G08B 21/00* (2006.01)  
*H04L 29/06* (2006.01)

(52) U.S. Cl.  
CPC ........ *H04L 63/1425* (2013.01); *H04L 63/1416* (2013.01); *H04L 63/1408* (2013.01)  
USPC .............................................. 726/23; 726/22

(58) Field of Classification Search  
CPC .................................................. H04L 63/1425  
USPC ..................................................... 726/22, 23  
See application file for complete search history.

(56) References Cited

U.S. PATENT DOCUMENTS

| 6,704,874 | B1 | 3/2004 | Porras et al. | |
|---|---|---|---|---|
| 2003/0149675 | A1* | 8/2003 | Ansari et al. | 706/2 |
| 2005/0044406 | A1* | 2/2005 | Stute | 713/201 |
| 2005/0044422 | A1 | 2/2005 | Cantrell et al. | |
| 2005/0188423 | A1* | 8/2005 | Motsinger et al. | 726/22 |
| 2006/0020814 | A1 | 1/2006 | Lieblich et al. | |
| 2006/0053490 | A1* | 3/2006 | Herz et al. | 726/23 |
| 2007/0073519 | A1* | 3/2007 | Long | 702/185 |
| 2007/0245420 | A1* | 10/2007 | Yong et al. | 726/23 |

OTHER PUBLICATIONS

International Search Report for PCT/US2008/001112, dated Jun. 25, 2008, 9 pp.  
Supplementary European Search Report for European Patent Application No. EP 08 72 4891, filed Jan. 29, 2008, European Patent Office, Munich, Germany, dated Mar. 1, 2011.

* cited by examiner

*Primary Examiner* — Alexander Lagor  
(74) *Attorney, Agent, or Firm* — Sterne, Kessler, Goldstein & Fox P.L.L.C.

(57) ABSTRACT

Methods, systems, and computer program products for insider threat detection are provided. Embodiments detect insiders who act on documents and/or files to which they have access but whose activity is inappropriate or uncharacteristic of them based on their identity, past activity, and/or organizational context. Embodiments work by monitoring the network to detect network activity associated with a set of network protocols; processing the detected activity to generate information-use events; generating contextual information associated with users of the network; and processing the information-use events based on the generated contextual information to generate alerts and threat scores for users of the network. Embodiments provide several information-misuse detectors that are used to examine generated information-use events in view of collected contextual information to detect volumetric anomalies, suspicious and/or evasive behavior. Embodiments provide a user threat ranking system and a user interface to examine user threat scores and analyze user activity.

23 Claims, 9 Drawing Sheets

| | Object Name | Object Path | Start/Stop Time | Client/Server IP Address | Success Status | Bytes | Original File Name | Printed Page Count | Printer | Search Phrase | E-mail Headers |
|---|---|---|---|---|---|---|---|---|---|---|---|
| File Reads | ✓ | ✓ | ✓ | ✓ | ✓ | ✓ | | | | | |
| File Writes | ✓ | ✓ | ✓ | ✓ | ✓ | ✓ | | | | | |
| File Moves | ✓ | ✓ | ✓ | ✓ | ✓ | | ✓ | | | | |
| File Deletes | ✓ | ✓ | ✓ | ✓ | ✓ | | | | | | |
| File Prints | ✓ | ✓ | ✓ | ✓ | ✓ | ✓ | | ✓ | ✓ | | |
| Directory Lists | ✓ | ✓ | ✓ | ✓ | ✓ | ✓ | | | | | |
| Search Queries | ✓ | ✓ | ✓ | ✓ | ✓ | | | | | ✓ | |
| E-mail Sends | ✓ | ✓ | ✓ | ✓ | ✓ | | | | | | ✓ |

INSIDER THREAT DETECTION

CROSS-REFERENCE TO RELATED APPLICATIONS

The present application is related to the following application of common assignee, which is herein incorporated by reference in its entirety:

U.S. patent application Ser. No. 11/790,037, titled "Passively Attributing Anonymous Network Events to Their Associated Users," filed Apr. 23, 2007.

BACKGROUND OF THE INVENTION

1. Field of the Invention

The present invention relates generally to computer networks, and more particularly to insider threat detection in computer networks.

2. Background Art

Trusted insiders committing espionage have caused tremendous damage to not only corporations but also U.S. national security.

Today, the problem of insider threat detection is challenging with large amounts of information to protect, the difficulty of tailoring computer access control policies to a user's "need to know", and the competing need to share information effectively. Yet, what makes insider threat detection especially difficult is that malicious insiders (MIs) are frequently legitimate users operating within their privileges.

Current cyber-detection methods are inadequate. For example, methods based on system log auditing and intrusion detection focus on rule breaking, are difficult to interpret, and frequently lack user attribution. As such, they are incapable of detecting MIs operating within their privileges or of correctly attributing observed activity to its associated user. On the other hand, methods based on focused user observation tools are only effective once the subject of the threat has been identified. Furthermore, both types of methods lack the "smart" analysis capabilities required to analyze and prioritize the large volumes of generated data, which could be the norm in a large organization network.

What are needed therefore are method, systems, and computer program products to detect when trusted insiders misuse information in a manner consistent with espionage. Further, methods, systems, and computer program products are needed that are capable of exploiting subtle differences between legitimate and MI behavior by leveraging contextual information about users and the information with which they interact.

BRIEF SUMMARY OF THE INVENTION

Methods, systems, and computer program products for insider threat detection are provided herein.

Embodiments of the present invention can be used to detect insiders who act on information to which they have access but whose activity is inappropriate or uncharacteristic of them based on their identity, past activity, organizational context, and/or the information context.

Embodiments of the present invention work by monitoring the network to detect network activity associated with a set of network protocols; processing the detected activity to generate information-use events; generating contextual information associated with users of and the information on the network; and processing the information-use events based on the generated contextual information to generate alerts and threat scores for users of the network.

Embodiments of the present invention can also be applied in non-network contexts including, for example, a user workstation context and an application context.

Embodiments of the present invention provide several information-misuse detectors that are used to examine generated information-use events in view of collected contextual information to detect relevant volumetric anomalies, suspicious and/or evasive behavior associated with MIs.

Embodiments of the present invention provide a user threat ranking system that can be implemented using a Bayesian Belief network to rank users of the network using a "threat score" for each user based on his/her activity over a specified time period. A user interface provides security analysts the ability to examine user threat scores and to analyze the underlying user activity.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Introduction

In a computing network system, access-control mechanisms yield a set of illegal and legal actions for each network user. However, because of difficulties in designing and maintaining access controls for a large, dynamic organization given the set of legal actions, there is typically a set of actions that are suspect, especially given contextual information about a user.

Detecting misuse by legitimate users abusing their privileges is a complex, multi-faceted problem. This is because malicious insiders (MIs) can engage in a variety of activities and use knowledge of their organization's systems and networks to avoid detection.

Embodiments of the present invention that are described below provide methods and systems to detect insiders who act on information to which they have access but whose activity is inappropriate or uncharacteristic of them based on their identity, past activity, organizational context, and/or the information context.

Methods and Systems for Insider Threat Detection

Figure 1:
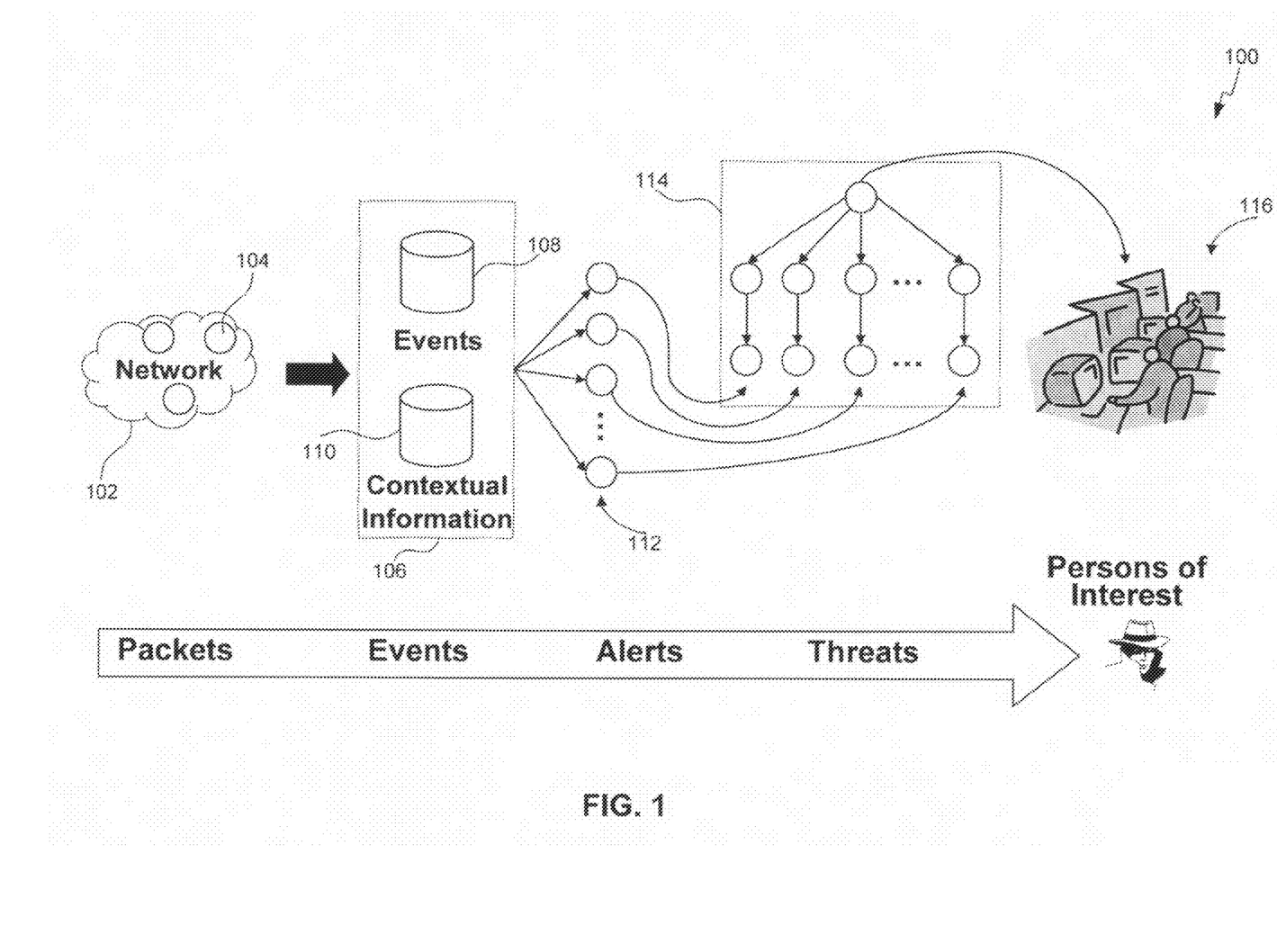
FIG. 1 is a high-level illustration of a system for insider threat detection according to an embodiment of the present invention.

FIG. 1 is a high-level illustration of a system 100 for insider threat detection according to an embodiment of the present invention. System 100 includes a plurality of network sensors 104, a database 106, a plurality of detectors 112, a Bayesian network system 114, and a user interface 116.

System 100 is configured to detect insider threats within a network 102. For example, network 102 may be an intranet of a large organization with thousands of legitimate users.

Sensors 104 are embedded within network 102 to detect user activity within the network. Typically, sensors 104 are placed between clients and servers within network 102 and are configured to monitor and collect network traffic associated with a set of network protocols that facilitate the use of information. For example, sensors 104 monitor and collect network packets associated with HTTP (Hypertext Transfer Protocol), SMTP (Simple Mail Transfer Protocol), FTP (File Transfer Protocol), and SMB (Server Message Block). Sensors 104 may also be placed on hosts to detect local activity that network-based sensors would not be able to detect. For example, a client-based sensor can detect a user moving files onto a removable drive or printing to a locally attached printer.

Database 106 includes network events 108 and contextual information 110. Network events 108 are generated from network traffic collected by sensors 104. Typically, a process, which may be performed offline or on-line, is used to process the collected network traffic and to generate information-use events. Information-use events provide contextual information about the information use associated with the collected network traffic. In an embodiment, generating information-use events is done using protocol decoders, which are applied to collected network packets.

Contextual information 110 is information that is gathered about users of and the information on the network as well as the organization. In an embodiment, contextual information 110 is periodically generated and/or updated. For example, the contextual information associated with a given user may include that user's information from an employee directory as well as information related to that user's past information-use activity. Information from an employee directory may include the user's name, office location, job description, seniority, and work projects. The user's network information-use activity includes information related to the user's activity pattern and history. For example, the user's past behavior and that of peer groups to which the user belongs may be used as another form of context against which the user's behavior is measured.

Information context is contextual information about the information on the network. In an embodiment, meta-data associated with documents (keywords, document ownership, organizational affiliation, etc.) is used to generate contextual information about documents. For example, the absolute directory path of documents can be generally used to associate the documents with the organization, project, or topic to which they belong. This is because most organizations use a relatively consistent methodology in organizing files on a network. This type of contextual information can be used, for example, to detect when users engage in browsing activity outside their departments/projects' scope.

In addition to user and information context, organization context is another type of contextual information that may be used. Organization context is related to written and unwritten organization-specific properties, rules, and/or policies. For example, in every organization, there are specified rules for performing certain types of activities, which are commonly known by members of the organization but are frequently not codified into the organization's policy.

Detectors 112 are configured to examine information-use events for volumetric anomalies, suspicious and/or evasive behavior. Typically, detectors 112 are activity-specific. In other words, each detector is designed to detect a certain type of activity and to determine whether that activity, in context, fits a targeted behavior. In an embodiment, the detector considers certain characteristics of the activity, including the time, location, and extent of its occurrence, as well as contextual information related to the user performing the activity, the information being acted upon by the activity, and/or the social network associated with the user. A social network associated with the user, for example, may be a group of organizational or professional peers of the user.

Detectors 112 generate alerts when their respective criteria for reporting are satisfied. These alerts are input into Bayesian network system 114. Bayesian network system 114 is configured to process the alerts to generate a threat score for each user of the network as well as a ranking of users by threat scores. A user interface 116 allows analysts to prioritize threats and to view current and past threat scores, detector alerts, information-use events and contextual information to determine whether they correspond to real insider threats or to false alarms. If a generated threat corresponds to a real insider threat, the analysts inform appropriate organizational authorities to take action. In an embodiment, user interface 116 only provides threat scores that are above a set threshold.

Figure 2:
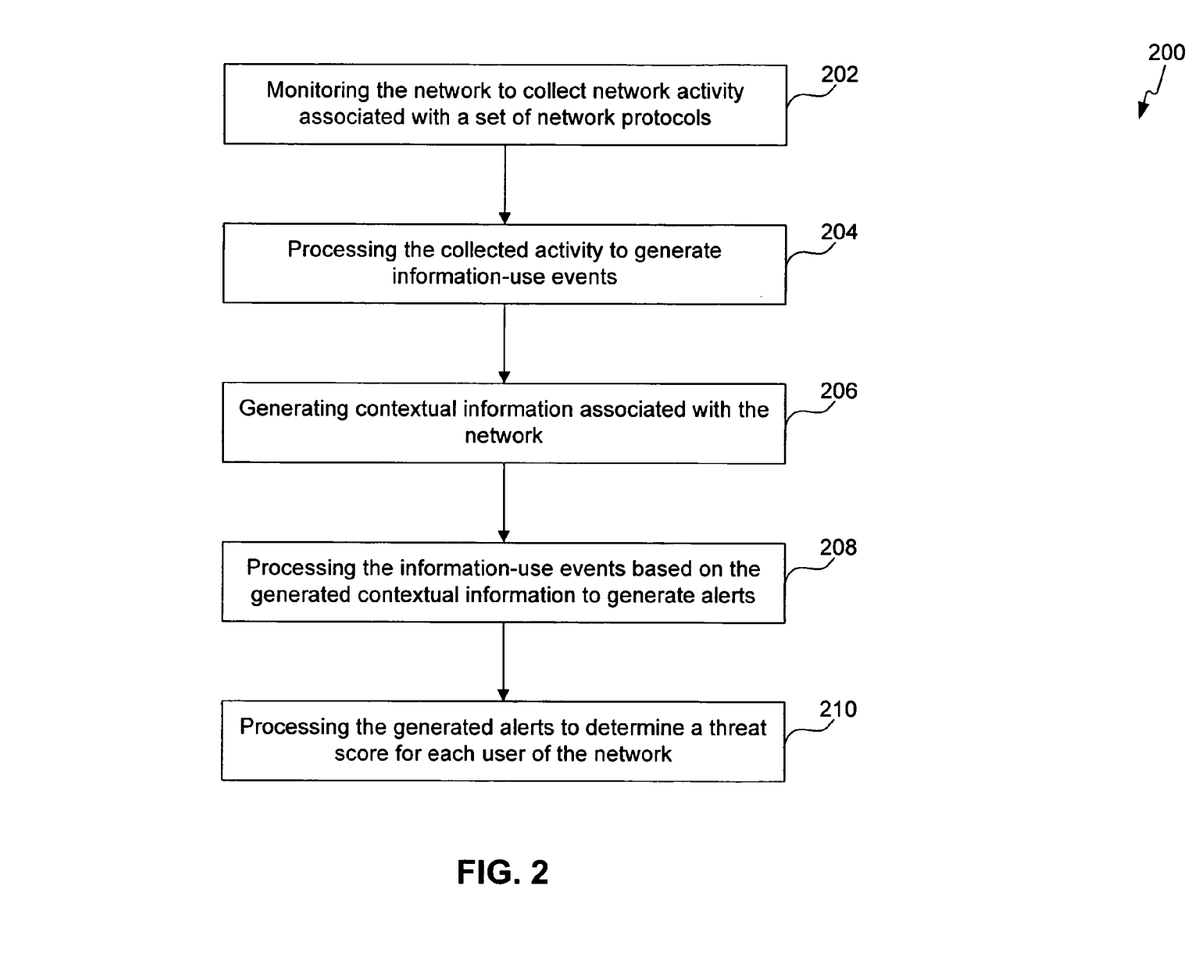
FIG. 2 is a process flowchart of a method for insider threat detection according to an embodiment of the present invention.

FIG. 2 is a process flowchart 200 of a method for insider threat detection according to an embodiment of the present invention. Process flowchart 200 begins in step 202, which includes monitoring the network to collect network activity associated with a set of network protocols. In an embodiment, step 202 includes collecting network packets associated with HTTP, SMTP, FTP, and SMB. Step 202, for example, may be achieved by sensors 101 in system 100 of FIG. 1. In other embodiments, information-use activity can be retrieved from other data sources including, for example, host-based focused observation tools and detailed audit logs.

Step 204 includes processing the collected activity to generate information-use events. In an embodiment, step 204 includes applying protocol decoders to collected network packets. Step 204 can be performed offline or on-line and can be performed within sensors 101 or using a process external to the sensors.

Step 206 includes generating contextual information associated with the network. In an embodiment, step 206 is performed periodically. The contextual information may include contextual information associated with users of the network, information located on the network, and the organization that employs the network. The contextual information associated with a given user, for example, may include the user's information from an employee directory and/or information related to the user's current network activity, the user's past behavior, and the behavior of the user's peers and/or all users. Additionally, the contextual information may include information context related to the information being acted upon by the user.

Step 208 includes processing the information-use events based on the generated contextual information to generate alerts. In an embodiment, step 208 includes examining the information-use events for volumetric anomalies, suspicious and/or evasive behavior, which are typical types of behaviors of malicious insiders. For example, since a malicious insider's activity occurs in addition to its normal activity, it produces detectable volumetric anomalies. Further, malicious insiders often engage in suspicious behavior in locating high-value information or information not associated with them and/or evasive behavior to avoid detection by trying to modify their illicit information-use behavior.

In an embodiment, step 208 includes examining network activities enabled by the information-use events, in view of certain characteristics of the activities and contextual information of users performing them, to determine whether the network activities fit certain patterns of misuse.

Step 210 includes processing the generated alerts to determine a threat score for each user of the network. In an embodiment, step 210 is performed using a Bayesian network. If a given user's threat score is above a set threshold, the user's activity is further examined to determine whether it corresponds to a real insider threat or a false alarm. In an embodiment, a user interface is provided to display the threat information to an analyst.

Further description of embodiments of the present invention are provided below.

Data Collection

As described above, data collection is one component of system and method embodiments of the present invention. Data collection involves collecting information from the network to generate an analysis data set, which can be used by subsequent processes to detect insider threats.

Figure 3:
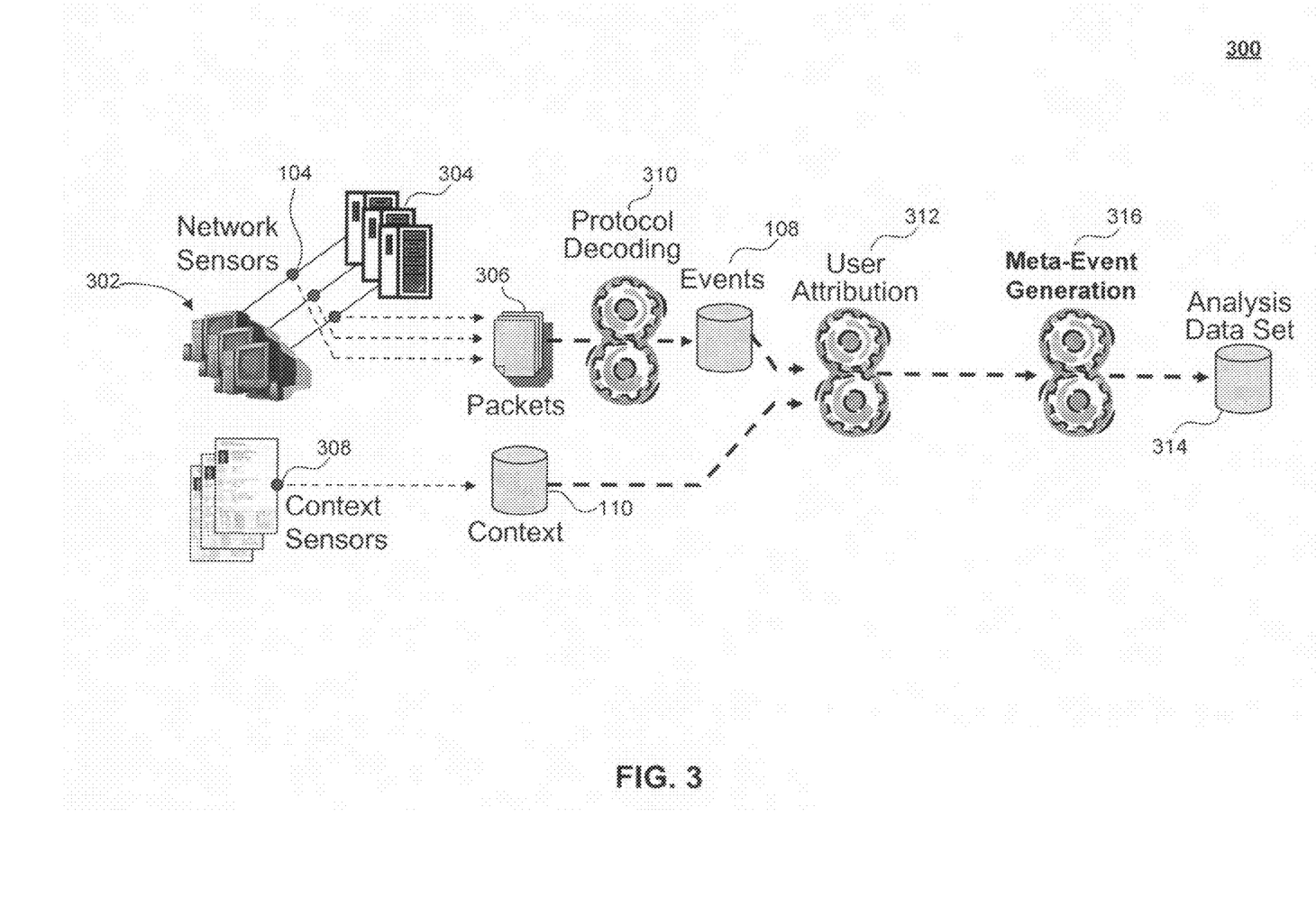
FIG. 3 is a high-level illustration of an example data collection process according to an embodiment of the present invention.

FIG. 3 is a high-level illustration of an example data collection process 300 according to an embodiment of the present invention. Process 300 comprises several steps including collecting network traffic and contextual information, transforming the collected traffic into information-use events, attributing anonymous events to their associated users, and generating an analysis data set.

Process 300 begins with collecting network traffic associated with specified network protocols. In an embodiment, as illustrated in FIG. 3, network sensors 104 are placed between clients 302 and servers 304 to capture packets 306 associated with the specified network protocols. For example, sensors 104 capture packets associated with HTTP, SMTP, FTP, and SMB. In another embodiment, sensors can be placed directly on clients 302 and/or servers 304. In a further embodiment, commercially-available focused observation tool products including network and desktop activity monitoring products can be used as sensors.

Figure 4:
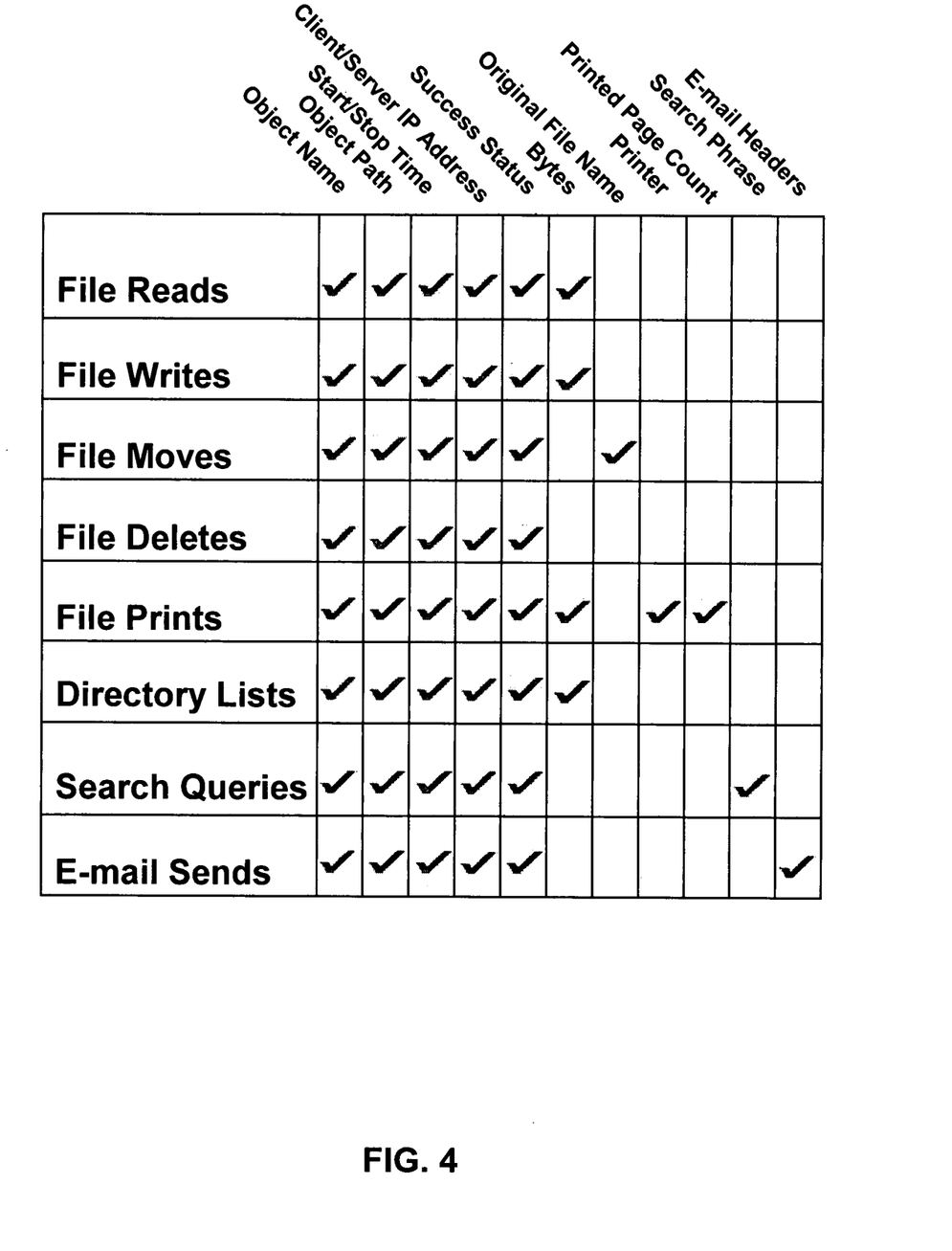
FIG. 4 is an example of information-use events.

The captured packets 306 are then processed either offline or on-line to generate information-use events 108. In an embodiment, selected packets are dissected using the network analyzer product Ethereal™ and then processed using protocol decoders 310 to transform them into information-use events. Note that only selected packets are processed as needed to understand the events. Further, only selected fields of the selected packets are extracted by the network analyzer product. Information-use events provide activity context from captured packets 306. FIG. 4 illustrates an example of information-use events.

In some cases, certain user actions generate inordinate number of events. This can be the case, for example, for an action executing a "find" command on a large, shared file system. In an embodiment, in order not to let such events skew the analysis, user events are segmented based on changes in network protocol, changes in the server's IP address, and time separation between consecutive events. Over each segment of events, the number and rate of occurrence of events are calculated as well as the percentage of list events in the segment. If a segment is longer than 20 events and the frequency of events is greater than two per second, then the segment is labeled as a meta-event. If, in addition, the percentage of list events within the segment is greater than 90%, then the segment is further labeled as being the result of a "find" command. These meta-events can be analyzed like other information-use events.

Together with network traffic collection, process 300 also includes periodically collecting contextual information related to the network users and the information that they accessed and manipulated. In example process 300, context sensors 308 are used to collect contextual information 110 from an employee directory, which may include the names, office locations, job descriptions, seniority information, and work projects of the network users. As will be further described below, this contextual information allows for a contextual monitoring of information-use events and, subsequently, a more accurate detection of threats. For example, a user's job description may be used in the analysis of his/her search-engine queries, or a user's behavior can be compared to that of his/her peers, such as those with the same job description or working on similar projects, to determine if the behavior is anomalous.

Process 300 may also include means 312 for attributing anonymous network events to their associated users. Further details about methods and systems of event attribution can be found in related patent application titled "Passively Attributing Anonymous Network Events to Their Associated Users", which is incorporated herein by reference. Optionally, process 300 also includes anonymization of the generated network events 108 and contextual information 110. This may be used to protect the privacy of network users and/or prevent analyst bias. Additionally, process 300 may include means 316 for meta-event generation.

The result of process 300 is an analysis data set 314, which is used by subsequent processes to perform contextual analysis of information-use events and to detect any insider threats.

Information-Misuse Detectors

Information-misuse detectors examine generated information-use events in view of collected contextual information to detect volumetric anomalies, suspicious and/or evasive behavior. Information-misuse detectors are typically developed based on a priori knowledge of typical user behavior in the network, consultation with insider threat experts, and/or public information about past cases of malicious insiders. For example, a detector may be based on a hypothesis related to a set of activities in which malicious insiders might engage. Note, however, that detectors suitable for one environment may not be suitable for another environment.

In an embodiment, each detector is designed to detect a certain type of activity and to determine whether that activity, in context, fits a targeted behavior. For example, the detector examines certain characteristics of the activity, including the time, location, and extent of its occurrence, and evaluates the activity in context with the user's organizational identity, the user's past activity or that of its peers, or the information involved in the activity.

In an embodiment, a detector works by receiving a time period and a set of parameters, examining each user's activity during the time period, and issuing an alert if the user's activity meets the detector's criteria for reporting. Generally, the detector examines events of one given type such as, for example, browsing, printing, downloading, or searching.

Alternatively, the detector may analyze events of different types, from multiple users, and/or from multiple periods of time.

Figure 5:
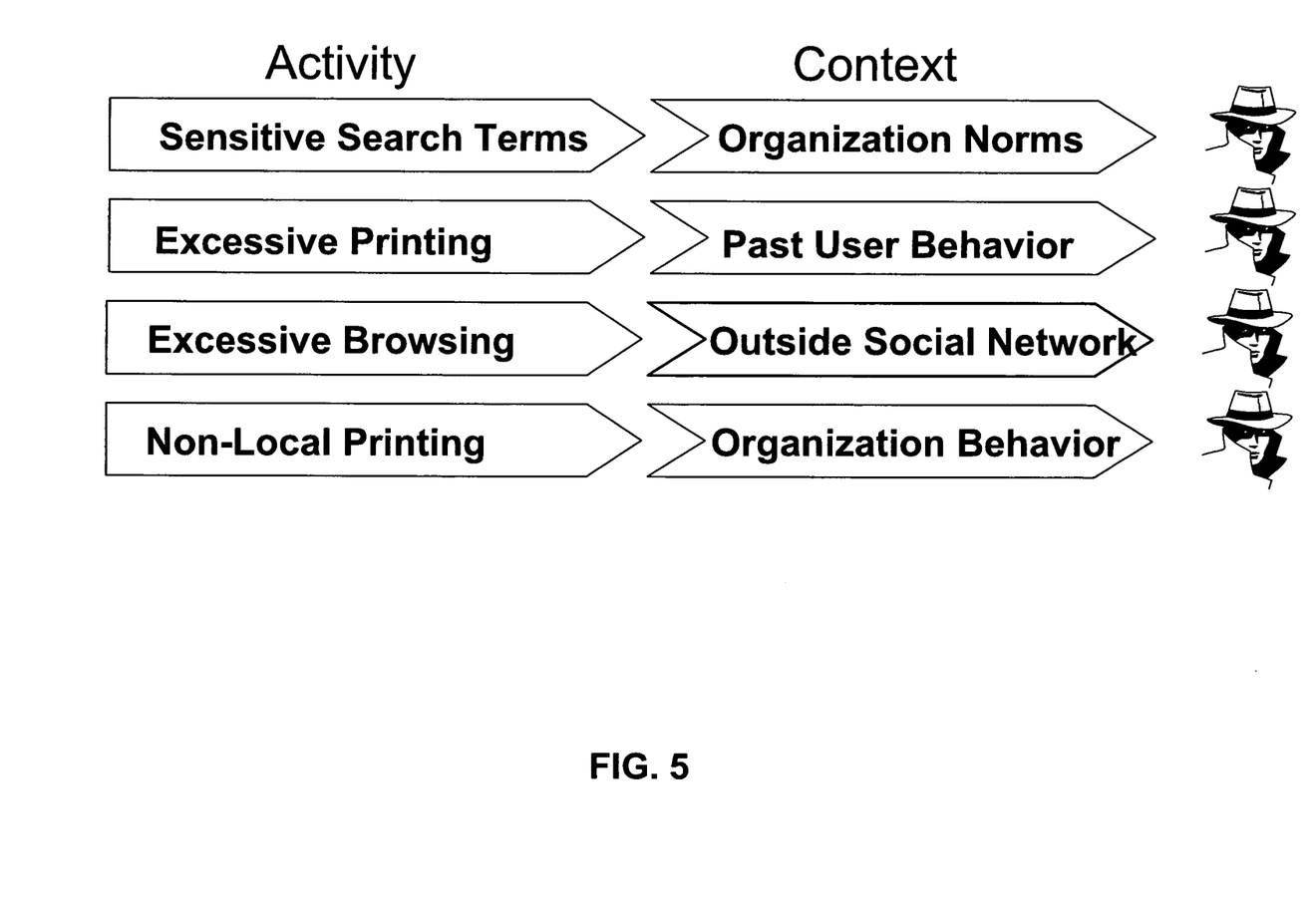
FIG. 5 illustrates example network activities and corresponding evaluation context.
Figure 6:
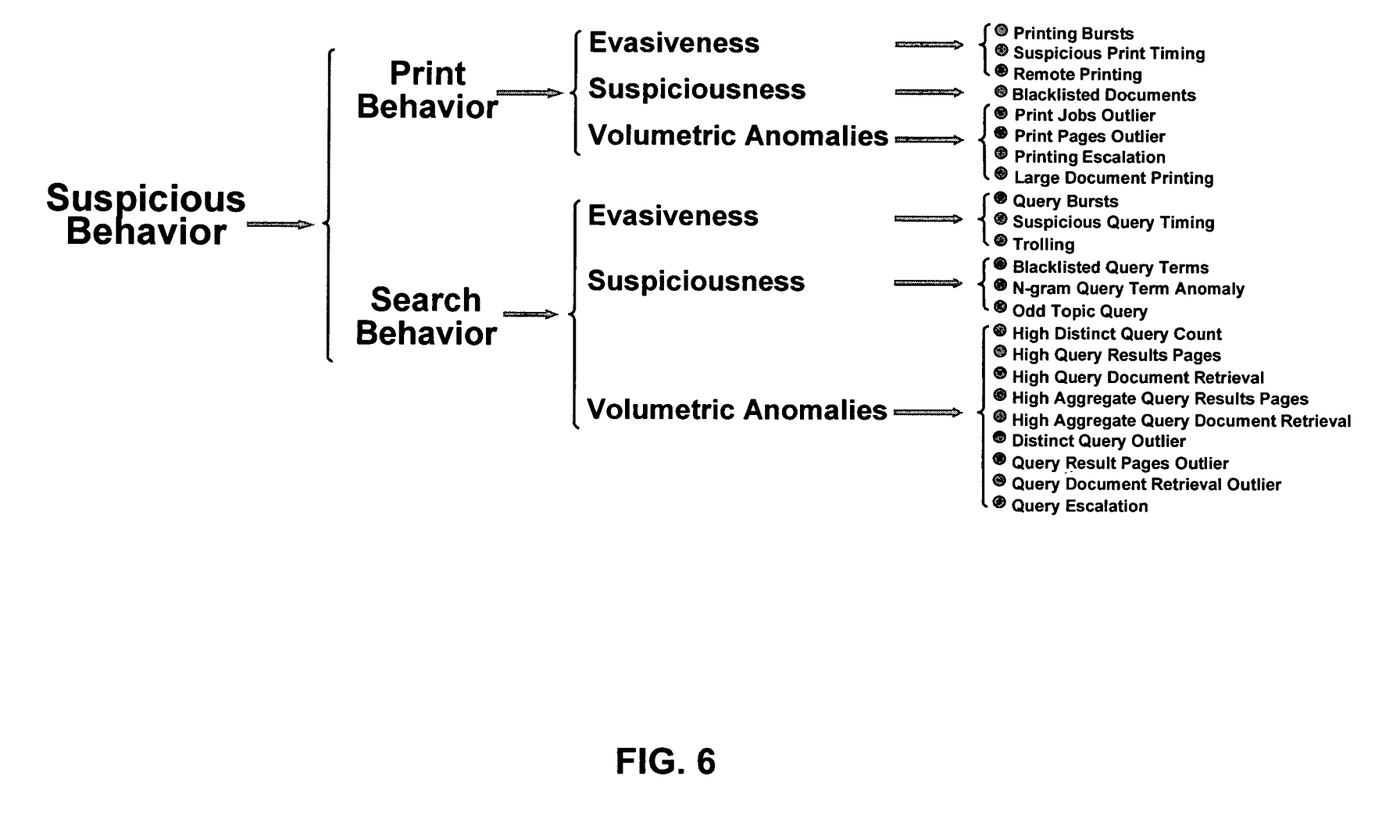
FIG. 6 illustrates example detectors for anomalous activity.

FIG. 5 illustrates example information-use activities and corresponding evaluation context based on which information-misuse detectors are developed in embodiments of the present invention. In an embodiment, 76 detectors are used, which can be implemented, for example, using hand-coded rules, parametric and non-parametric density estimation, and by exploiting social networks, although the number of detectors used is implementation dependent. The detection methods used may also be implementation dependent. FIG. 6 illustrates several example detectors. A representative few are described below.

Sensitive Search Terms: Typically, insiders use search engines to find, evaluate, and collect information. Most organizations can define a set of sensitive terms that appear in documents but that would be inappropriate for use as query terms. These terms vary from one organization to another. The term "proprietary" is an example of such terms, which may be considered a sensitive term. In embodiments of the present invention, a list of sensitive search terms can be constructed, with the help of domain experts, for example. A corresponding detector would issue an alert whenever a query containing one of the sensitive terms is detected.

Printing to a Non-Local Printer: In certain organizations, printing a document is often the only way to take information from the organization. Presumably, an insider's co-workers would recognize if the topic of a printed document is inappropriate. As such, to avoid suspicion, the insider may print documents that are inappropriate to distant or non-local printers. A detector for such activity can be implemented using various parameters. In an embodiment, for each document printed, the user who issued the print command, the location where the print command was issued, and the printer to which the command was sent are examined to determine whether or not the document was sent to a nearby printer.

Anomalous Browsing Activity: In order to identify high-value information with which they may not be familiar, MIs may perform a high degree of browsing. Typically, a user's past browsing pattern is taken into account in examining such anomalous activity.

An example of detectors used to detect anomalous browsing activity is one that alerts when a user browses an anomalous number of documents in a 15-minute period of time. In typical environments, statistical measurements indicate that the number of documents browsed by a user in a 15-minute time period follow a folded-normal distribution (normally distributed data with no negative values and a positive mean). In an embodiment, for a given time period and user, the detector calculates the maximum number of browses by the user during any 15-minute interval with the time period. The detector then retrieves the number of browses by the user during each 15-minute period going back a certain number of days from the start of the time period. Based on the calculated and retrieved data, the detector then estimates the parameters of a folded-normal probability density function (pdf) (mean, standard deviation, and the number of non-zero 15-minute intervals) and uses the pdf to calculate the probability that the user conducts the maximum number of browses observed in the time period. If the calculated probability is lower than a pre-determined threshold, then the detector issues an alert. In another embodiment, the detector can be implemented using a kernel-density estimator.

Detectors may also be used for other types of information-use activities including, for example, printing a large document, downloading a large number of documents, or executing a large number of search queries.

Retrieving Documents Outside of One's Social Network: Insiders often steal information to which they have access but that is outside the scope of their duties and, thus, not closely associated with them. This disassociation makes it more difficult for an organization to determine a leak's source when it discovers an information compromise. To enable a detector for this type of activity, embodiments of the present invention build a social network for each user to determine the extent that the user normally retrieves documents from locations associated with people inside or outside his/her social network. A user's social network may include, for example, people in the user's department, people that the user emails, and/or people with whom the user works on projects. In an embodiment, a detector for this activity works by counting the number of documents that a user retrieves that are associated with users from outside his/her network and compares this count to a pre-determined threshold. The threshold is set according to the user's past behavior and can be measured by determining the percentage of documents that the user retrieved from outside his/her network over a statistically representative period of time.

Figure 7:
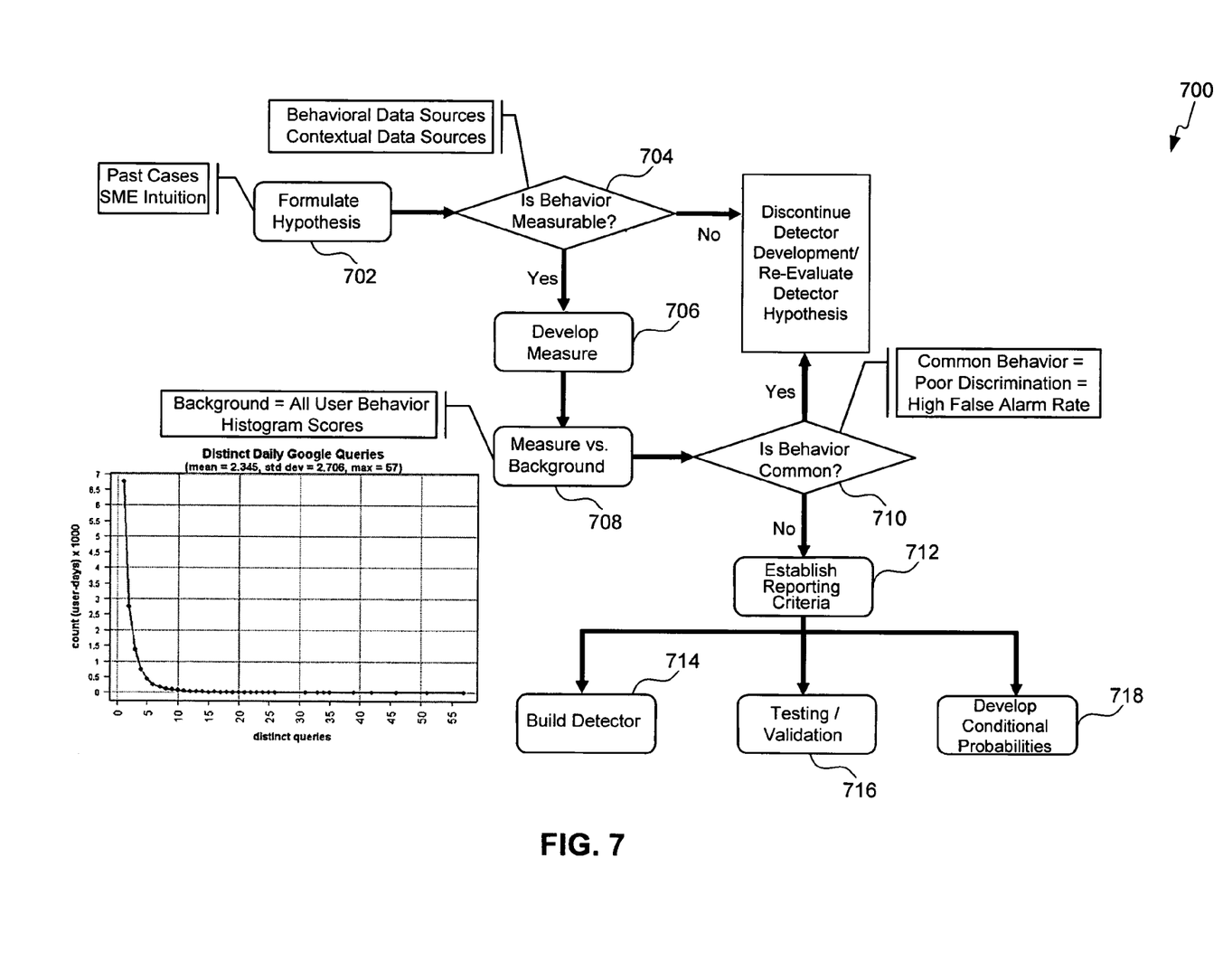
FIG. 7 is an example process for developing an information-misuse detector.

FIG. 7 is an example process 700 for developing an information-misuse detector. Process 700 begins in step 702, which includes formulating a hypothesis to detect an anomalous behavior. For example, step 702 can be performed using past cases of malicious insiders or assistance from subject matter experts.

In step 704, the behavior sought to be detected is examined to determine whether it is measurable. This can be done by examining behavioral data sources and/or contextual data sources to determine whether sufficient information is available to measurably characterize the behavior.

If the behavior is measurable, step 706 includes developing a measure for the behavior. Subsequently, the developed measure is used in step 708 to develop a background context, which, for example, statistically describes this behavior for all users or sub-groups of users of the network.

Based on the background context, step 710 includes determining whether the behavior is common among the users. If common, then the behavior is likely a normal behavior in the network and detecting MIs through the behavior would be highly difficult given that there is little or no discrimination between legitimate and MI behavior. Otherwise, step 712 includes establishing the reporting criteria for the behavior, which may be used by a detector to issue alerts when the behavior becomes anomalous. Subsequently, in steps 714 and 716, the detector is built, tested, and validated to ensure that it achieves a high level of detection and a manageable level of false alarms. In step 718, conditional probabilities are developed by subject matter experts, which are used in a Bayesian Network, as will be described below, to generate threat scores for users of the network.

Threat Ranking Using a Bayesian Belief Network

For any given user, the supported detectors may alert in any combination depending on the activity of the user. In an embodiment of the present invention, a set of 76 detectors is built to detect distinct types of user activity. As such, $2^{76}$ possible combinations of alerts are possible. A human analyst would thus be unable to comprehend the meaning or the severity of such alerts for all but the smallest of organizations.

In one approach, a ranking system is used to rank the users of the network using a "threat score" for each user based on his/her activity over a specified time period. Subsequently, users with threat scores above a certain threshold can have their activity further examined by analysts.

In an embodiment, a Bayesian Belief network is used to implement this approach. Bayesian Belief networks are generally well known. Bayesian Belief networks as applied to embodiments of the present invention shall now be described in greater detail. In an embodiment, for each user of the network, the user's information-use events and contextual information are provided to the set of detectors, which will accordingly issue a set of alerts. The alerts are then input into a Bayesian network system to calculate the threat score of the user.

Figure 8:
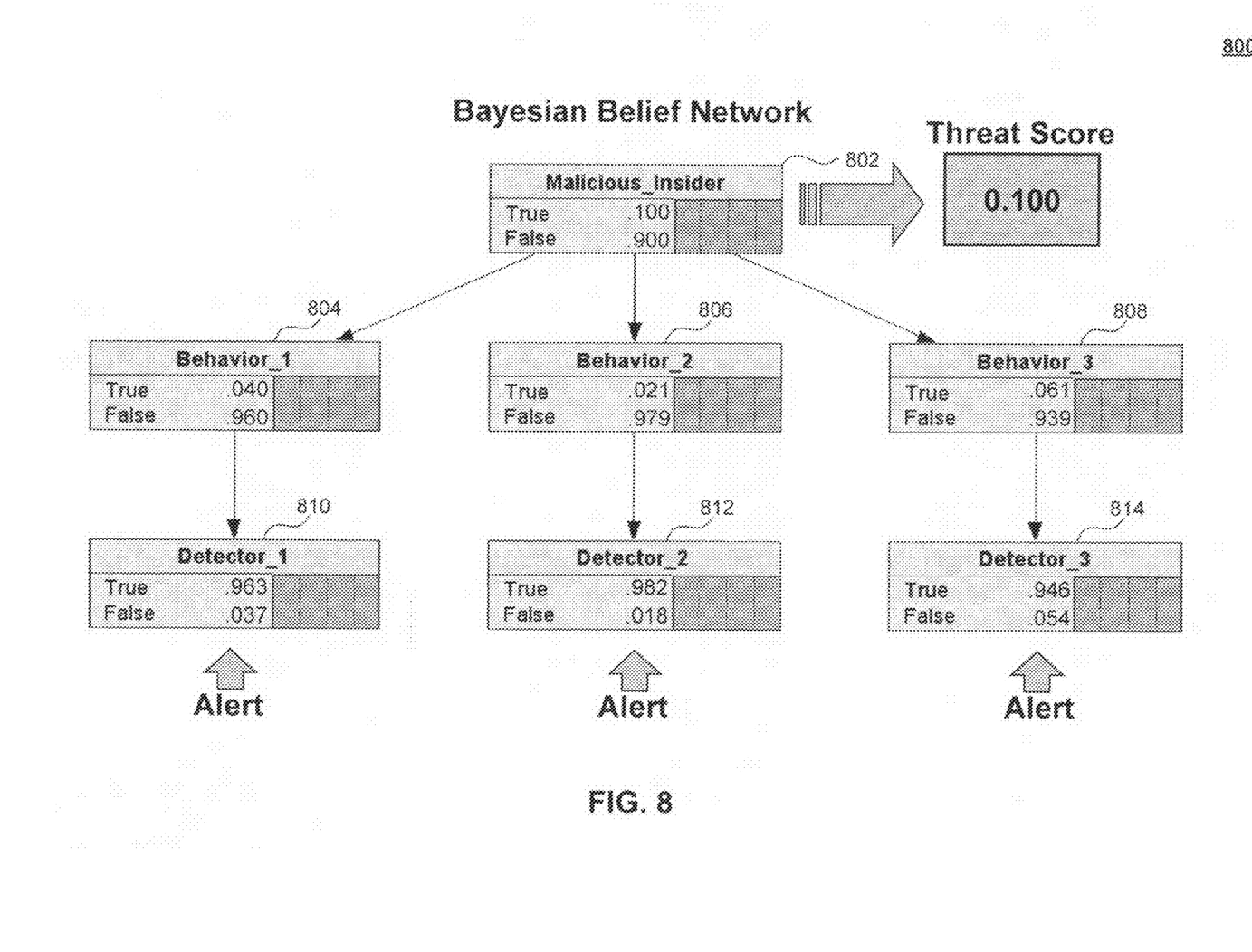
FIG. 8 is an example Bayesian Belief Network that is used to generate threat scores for detecting malicious users.

FIG. 8 is an example Bayesian Belief network 800 that illustrates the calculation of a user's threat score. The values shown in FIG. 8 are for illustration only. Example Bayesian Belief network 800 is a tree-structure network. Embodiments of the present invention are not limited to example Bayesian network 800. In other embodiments, Bayesian networks with other structures including multivariate and/or numeric random variables can be used.

Example network 800 is a tree-structured network, with each node in the network representing a random variable. For example, node 802 represents the random variable Malicious_Insider. Since node 802 is a parent-less node, the "True" and "False" values associated with that node represent prior probabilities. For example, the probability that a user is a malicious insider is 0.1% according to the example of FIG. 8. The probability that a user is not a malicious insider is 99.9%. Typically, these prior probabilities vary from one organization to another and can be determined with the help of subject matter experts based on the size and type of the organization.

The second level nodes 804, 806, and 808 represent random variables associated with different types of behaviors in the network. For example, node 804 is associated with Behavior_1, which, for example, is the suspicious behavior of printing to a non-local printer. Nodes 804, 806, and 808 are children nodes of node 802. As such, the "True" and "False" values associated with them represent conditional probabilities based on the random value in node 802 being true. For example, the "True" value of 4.01% associated with node 804 represents the conditional probability that Behavior_1 occurs given that the user is a malicious insider. On the other hand, the "False" value of 95.9% associated with node 804 represents the conditional probability that Behavior_1 does not occur given that the user is a malicious insider. The "True" and "False" values associated with nodes 804, 806, and 808 can be estimated or elicited from domain experts and vary from one type of behavior to another.

The third level nodes 810, 812, and 814 represent random variables associated with the detectors that have issued alerts due to the user's events. For example, node 810 is associated with Detector_1, which is the detector configured to detect Behavior_1. Nodes 810, 812, and 814 are children nodes of nodes 804, 806, and 808, respectively. As such, the "True" and "False" values associated with each of them represent conditional probabilities. For example, the "True" value of 96.3% associated with node 810 represents the conditional probability that Detector_1 issues an alert given that Behavior_1 occurs. In other words, it is the "true positive" rate of Detector_1 given that Behavior_1 occurs. On the other hand, the "False" value of 3.61% represents the conditional probability that Detector_1 does not issue an alert given that Behavior_1 occurs or the "False positive" rate of Detector_1.

The "True" and "False" values associated with nodes 810, 812, and 814 are determined based on the type of detector. The conditional probabilities of these nodes can be estimated or determined with the help of domain experts. For "rule-based" detectors, the conditional probabilities approach 100% and 0% for the "true positive" and "false positive" rates, respectively. Rule-based detectors are configured to test whether an activity occurred using a rule. For example, a detector configured to detect whether a user printed to a non-local printer is a rule-based detector, and assuming that no errors occur in the system, its "true positive" rate should be 100%. On the other hand, for "statistics-based" detectors, the conditional probabilities are determined based on statistical distributions associated with the behavior being monitored. For example, a detector that alerts when a user prints an anomalously large number of documents uses an estimator based on a folded-normal distribution.

Example Implementation and Evaluation

The ELICIT (Exploit Latent Information to Counter Insider Threats) system is an example implementation of an example embodiment of the present invention.

In an evaluation of ELICIT, a data set was derived from 284 days of network traffic collected from an operational corporate intranet. This data collection and processing was performed over a period of 13 months and included the processing of 16 terabytes of raw packets into more than 91 million network events for more than 3,900 users. The network events were then examined to characterize the searching, browsing, downloading, and printing activity of individuals, groups of individuals, and the organization as a whole.

Based on analysis, research, and consultation with domain experts, 76 detectors and a Bayesian network were developed that generates an overall threat score for each user in the organization. A web-based interface was also developed, which allows analysts to view daily threat scores, focus on individuals of interest, execute tailored analyses, and examine the events that led to individual results.

To evaluate ELICIT, scenarios based on information from real, publicly-available cases were developed, adapted to the corporate intranet, and executed during normal network operation. Over a period of two months, using a threat score threshold of 0.5, ELICIT detected the insiders on 16 of the 19 days that they were active, corresponding to a detection rate of 0.84. During the same period, ELICIT scored an average of 1,548 users per day, with an average of 23 users scoring high enough to warrant further scrutiny. This translated into ELICIT having an average false-positive rate of 0.015.

Example Computer Implementation

Figure 9:
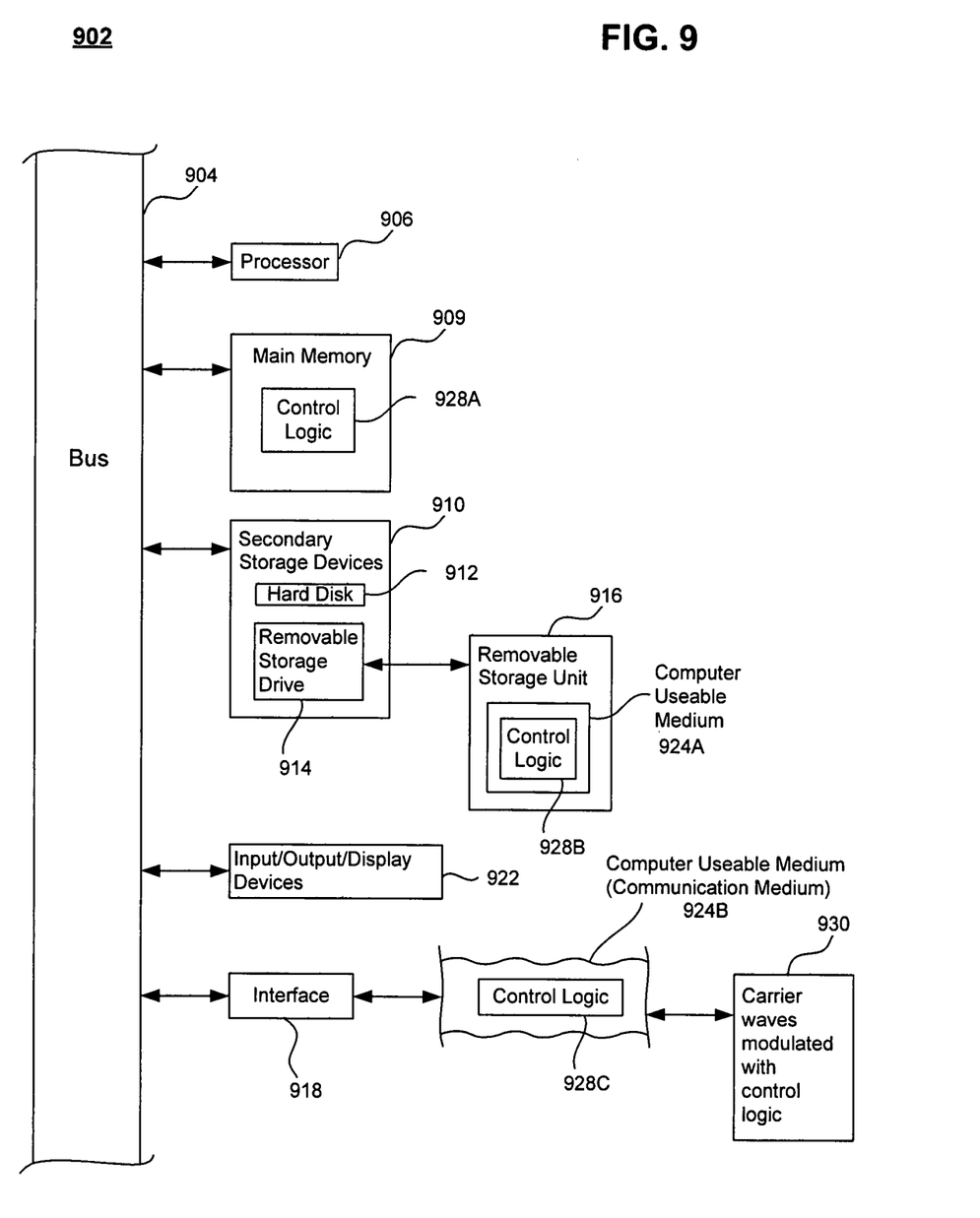
FIG. 9 illustrates an example computer useful for implementing components of the invention.

In an embodiment of the present invention, the system and components of the present invention described herein are implemented using well known computers, such as computer 902 shown in FIG. 9.

The computer 902 can be any commercially available and well known computer capable of performing the functions described herein, such as computers available from International Business Machines, Apple, Sun, HP, Dell, Compaq, Digital, Cray, etc.

The computer 902 includes one or more processors (also called central processing units, or CPUs), such as a processor 906. The processor 906 is connected to a communication bus 904.

The computer 902 also includes a main or primary memory 908, such as random access memory (RAM). The primary memory 908 has stored therein control logic 928A (computer software), and data.

The computer 902 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924 having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well known manner.

The computer 902 also includes input/output/display devices 922, such as monitors, keyboards, pointing devices, etc.

The computer 902 further includes a communication or network interface 918. The network interface 918 enables the computer 902 to communicate with remote devices. For example, the network interface 918 allows the computer 902 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from the computer 902 via the communication medium 924B. More particularly, the computer 902 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 902, the main memory 908, the secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for insider threat detection in a network, comprising:
   collecting network packets associated with a set of network protocols, wherein the network packets are transmitted over the network;
   processing the collected network packets to generate information-use events for a user of the network, wherein the information-use events provide information regarding information-use activities performed by said user;
   generating contextual information, wherein said contextual information includes at least one of: user directory information of said user, past information-use activity of said user, and meta-data associated with information residing on the network;
   processing the information-use events in view of the generated contextual information to generate an alert for said user when the information-use activities performed by said user substantially matches one or more types of targeted behaviors,
   wherein processing the information-use events further comprises:
      generating a probability distribution function that provides a probability that the user performs a particular information-use activity of said information-use activities a number of times over a predetermined time period;
      determining, using said probability distribution function, a current probability based on the information-use activities performed by the user; and
      generating said alert for the user when the current probability is lower than a pre-determined threshold; and
   processing the generated alert using a Bayesian network system to determine a threat score of said user.

2. The method of claim 1, wherein processing the collected network packets comprises:
   applying protocol decoders to the collected network packets; and
   attributing the generated information-use events to said user.

3. The method of claim 1, wherein generating contextual information comprises:
   generating contextual information associated with at least one of: a group of users of the network and all users of the network.

4. The method of claim 1, wherein generating contextual information comprises:
   retrieving information associated with users of the network; and
   collecting information related to at least one of: past network activity and current network activity of the users of the network.

5. The method of claim 1,
   wherein the meta-data is associated with documents residing on the network.

6. The method of claim 1, wherein said step of generating contextual information comprises:
   generating contextual information associated with an organization employing the network, wherein said contextual information includes information associated with organization-specific properties, rules, and policies.

7. The method of claim 1, wherein said step of generating contextual information is performed periodically.

8. The method of claim 1, wherein said step of processing the information-use events comprises:
   processing the information-use events to determine at least one of volumetric anomalies, suspicious and evasive behavior.

9. The method of claim 1, further comprising:
   further examining the information-use activities performed by said user when the threat score associated with said user is above a pre-determined threshold.

10. The method of claim 1, wherein said step of processing the information-use events comprises:
    receiving a time period; and
    providing the information-use events associated with said user during said time period and appropriate context to a set of detectors, wherein each of said detectors is configured to detect a respective type of anomalous behavior.

11. A system for insider threat detection in a network, comprising:
a plurality of network sensors embedded within the network configured to collect network packets associated with a set of protocols, wherein the network packets are transmitted over the network;
a plurality of context sensors configured to generate contextual information, wherein said contextual information includes at least one of: user directory information of a user of the network, past information-use activity of said user, and meta-data associated with information residing on the network;
a plurality of protocol decoders configured to process the collected network packets to generate information-use events for said user, wherein the information-use events provide information regarding information-use activities performed by said user;
a database configured to maintain an analysis data set, wherein said analysis data set includes said information-use events and contextual information;
a plurality of detectors configured to process the information-use events in view of the generated contextual information to generate an alert when the information-use activities performed by said user substantially matches one or more types of targeted behaviors,
wherein at least one of the plurality of detectors is further configured to:
generate a probability distribution function that provides a first probability that the user performs a particular information-use activity of said information-use activities a number of times over a predetermined time period;
determine, using said probability distribution function, a current probability based on the information-use activities performed by the user; and
generate said alert for the user when the current probability is lower than a pre-determined threshold; and
a Bayesian network module configured to receive the generated alert and to generate a threat score of said user of the network based on the generated alert.

12. The system of claim 11, further comprising:
a user interface configured to control said network sensors, context sensors, protocol decoders, database, detectors, and Bayesian network module.

13. The system of claim 11, further comprising:
a user interface configured to present events, context, alerts, threat scores, and analysis results in textual, numeric, and graphical forms.

14. The system of claim 11, wherein said network sensors are located between clients and servers of the network.

15. The system of claim 11, wherein each of said plurality of detectors is configured to detect a respective targeted behavior.

16. The system of claim 11, wherein said detectors are configured to detect at least one of volumetric anomalies, suspicious and evasive behavior in the information-use activities performed by said user.

17. The system of claim 11, wherein one or more of said detectors are developed based on a priori knowledge of at least one of: typical user behavior in the network, consultation with insider threat experts, and public information about past cases of malicious insiders.

18. The system of claim 11, wherein at least one of said detectors is a rule-based detector that is configured to determine whether a respective behavior occurs in the network.

19. The system of claim 11, wherein at least one of said detectors is a statistics-based detector that is configured to determine whether an observed behavior is anomalous based on a statistical distribution function associated with the behavior.

20. The system of claim 11, wherein the Bayesian network module is further configured to generate a second probability that said user is a malicious insider given the generated alerts associated with the user.

21. A computer program product comprising a computer useable hardware medium having computer program logic recorded thereon, the computer logic when executed by a processor enabling insider threat detection in a network according to a method, the method comprising:
collecting network packets associated with a set of network protocols, wherein the network packets are transmitted over the network;
processing the collected network packets to generate information-use events for a user of the network, wherein the information-use events provide information regarding information-use activites performed by said user;
generating contextual information, wherein said contextual information includes at least one of: user directory information of said user, past information-use activity of said user, and meta-data associated with information residing on the network;
processing the information-use events in view of the generated contextual information to generate an alert for said user when the information-use activites performed by said user substantially matches one or more types of targeted behaviors,
wherein processing the information-use events further comprises:
generating a probability distribution function that provides a probability that the user performs a particular information-use activity of said information-use activities a number of times over a predetermined time period;
determining, using said probability distribution function, a current probability based on the information-use activities performed by the user; and
generating said alert for the user when the current probability is lower than a pre-determined threshold; and
processing the generated alert using a Bayesian network system to determine a threat score of said user.

22. The computer program product of claim 21, wherein the method further comprises:
applying protocol decoders to the collected network packets; and
attributing the generated information-use events to their associated users.

23. The computer program product of claim 21, wherein the method further comprises:
generating contextual information associated with at least one of: a group of users of the network and all users of the network.

* * * * *